UNITED STATES PATENT OFFICE.

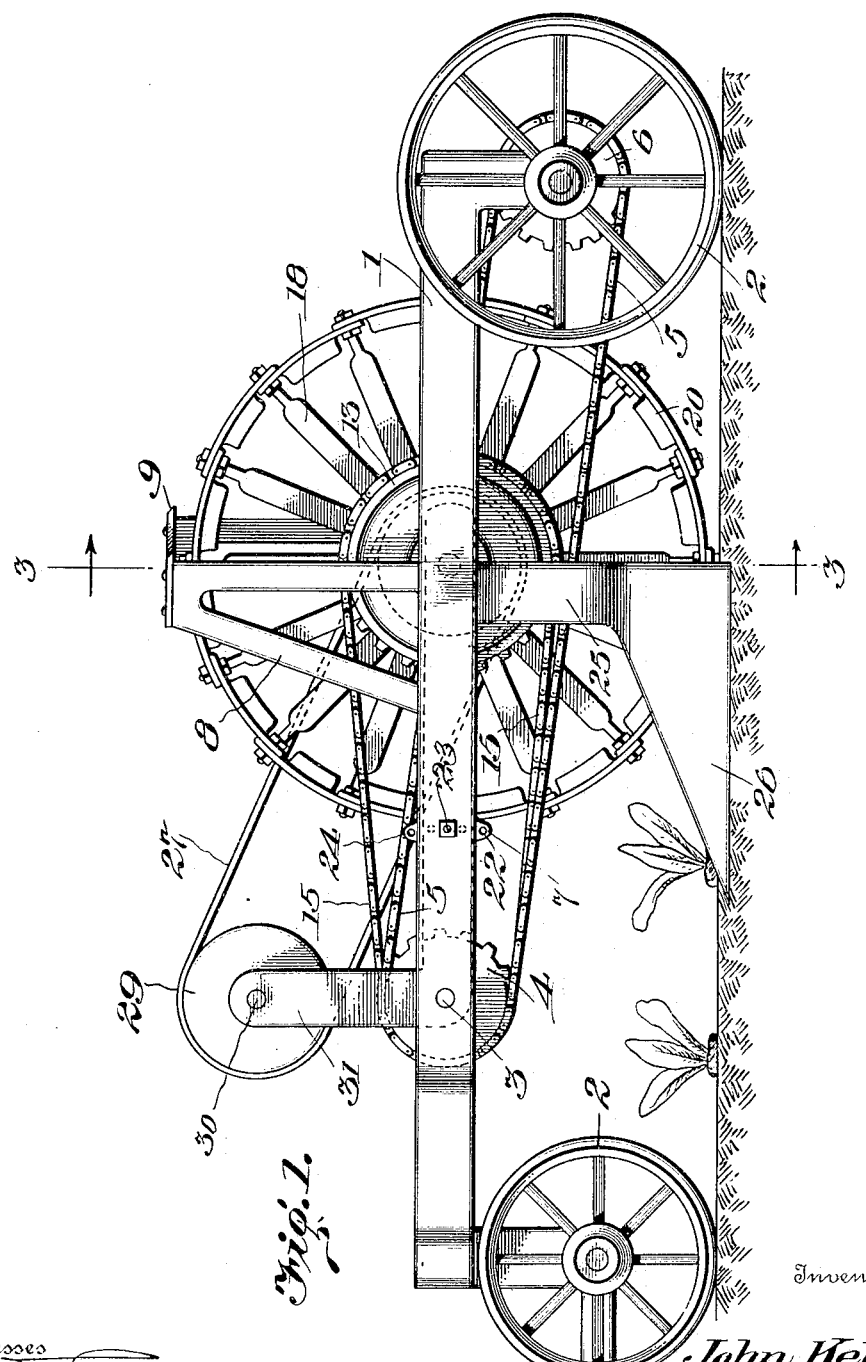

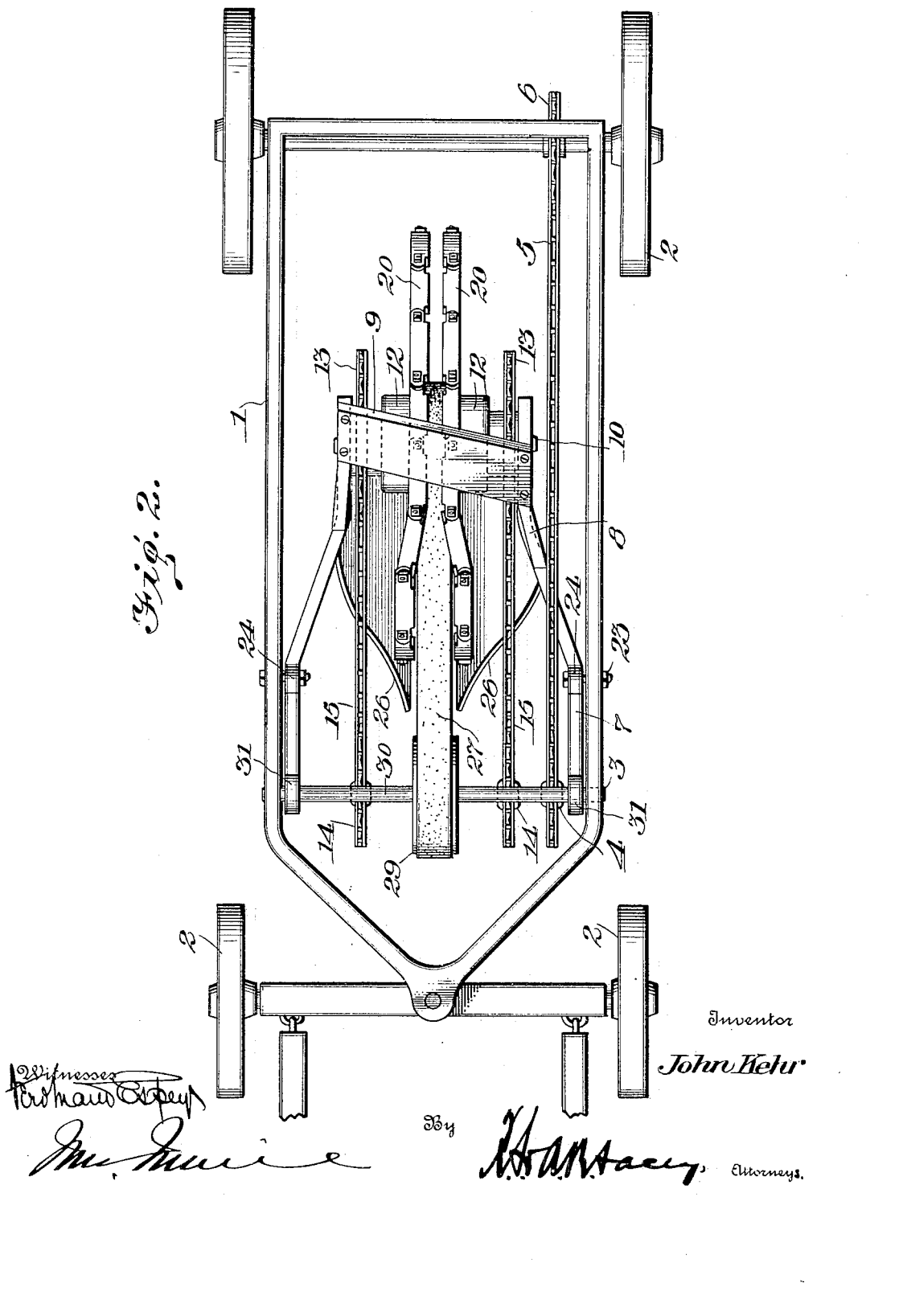

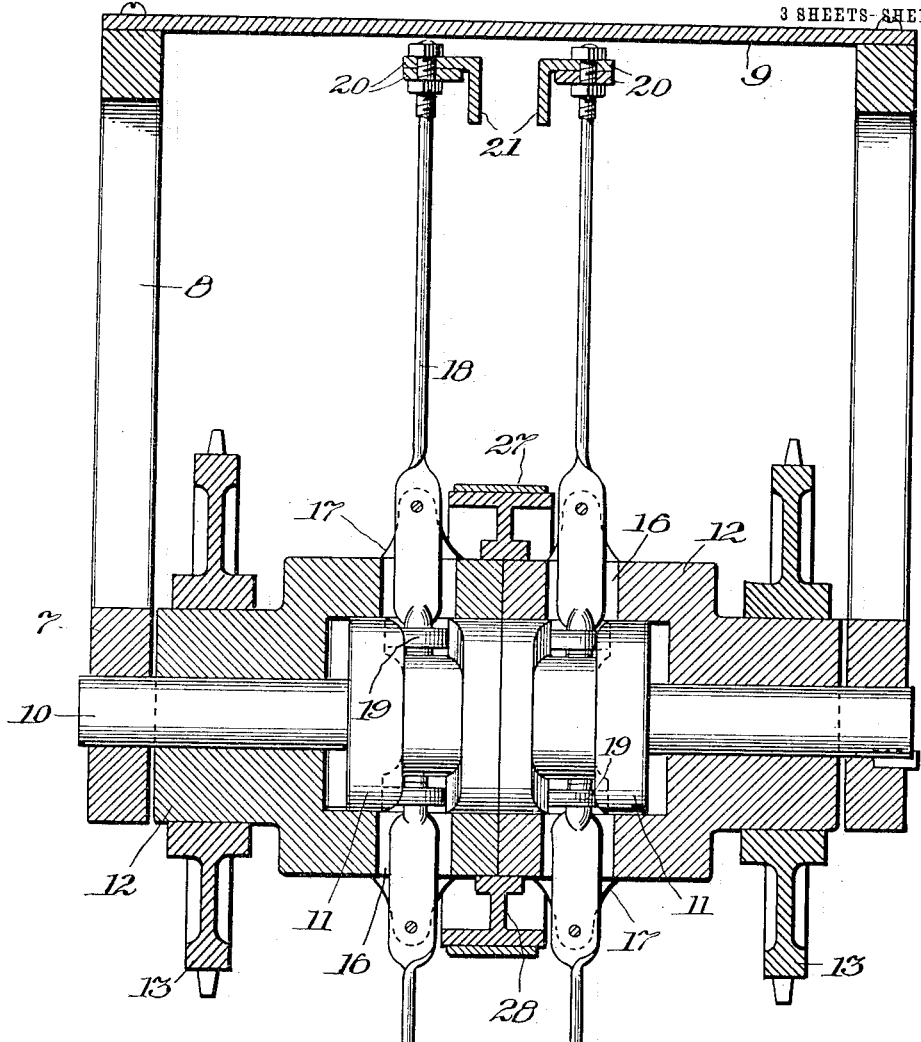

JOHN KEHR, OF GILFORD, MICHIGAN.

BEET-HARVESTER.

1,121,372.  Specification of Letters Patent.  Patented Dec. 15, 1914.

Application filed March 6, 1913, Serial No. 752,506. Renewed October 20, 1914. Serial No. 867,668.

*To all whom it may concern:*

Be it known that I, JOHN KEHR, citizen of the United States, residing at Gilford, in the county of Tuscola and State of Michigan, have invented certain new and useful Improvements in Beet-Harvesters, of which the following is a specification.

This invention relates to beet harvesters, and has for its object the provision of a simple and efficient mechanism which may be drawn along a row of beets and during its travel will uproot the beets and deliver them to a cutter by which the tops will be severed from the beet bodies.

A further object of the invention is to provide a beet harvester which will be automatic in its operation and which will firmly hold the beets until the tops are severed from the bodies and will then release the tops so that they may fall to the ground or may be gathered in receptacles provided for that purpose.

Further objects of the invention will appear as the description of the same proceeds and the invention consists in certain novel features which will be particularly pointed out in the claims following the description.

The invention is illustrated in the accompanying drawings, in which:

Figure 1 is a side elevation of one embodiment of the invention; Fig. 2 is a plan view of the same; Fig. 3 is an enlarged transverse section of the gathering or pulling wheels and the mechanism for operating the same.

In carrying out my invention, I employ a frame 1 which may be of any desired or convenient form and is supported upon traction wheels 2, the rear wheels in the illustrated arrangement being utilized as driving wheels and the forward wheels being utilized as steering wheels to the axles of which any convenient draft appliances may be attached. Between the side bars of the main frame 1, adjacent the front end thereof, I provide a counter-shaft 3 upon which is secured a sprocket wheel 4 connected by a chain 5 with a driving sprocket wheel 6 on the axle of the rear wheels 2. Pivotally mounted upon the counter-shaft 3 is an inner supplemental frame 7 which extends rearwardly from the said counter-shaft and consists essentially of two side bars having their rear portions converging and equipped at their rear extremities with upright frames or standards 8 to the upper ends of which is secured a knife or cutter 9 which bridges the space between the said standards. In the rear extremities of the side bars of the frame 7 is secured a rod or stationary shaft 10 upon which at the center thereof are secured or formed cams 11. Fitted loosely upon this rod or stationary shaft and inclosing the said cams are sleeves or hubs 12 which are equipped at their outer ends with sprocket wheels 13 over which and other sprocket wheels 14 upon the shaft 3 are trained sprocket chains 15, as shown and as will be readily understood. The inner portions of the sleeves or hubs 12 are constructed with longitudinal slots 16 and upon the outer surfaces of the hubs, immediately adjacent the said slots, are formed lugs or ears 17 between which are pivoted the spring steel spokes 18 having their inner ends engaging the grooves of the cams 11 and preferably equipped with rollers 19 to reduce the frictional wear. The outer ends of the spokes 18 are secured to and form the pivotal connections between a series of angle-iron links or segments 20 which constitute the peripheries of the gathering or pulling wheels. These angle-iron segments or links are so disposed that their vertical flanges will be between the opposed spokes and the spokes are so disposed as to radiate from the cams and the hubs in pairs, as clearly shown.

As the machine is drawn over the field, motion will be imparted to the hubs or sleeves 12 through the described sprocket gearing and the gathering and pulling wheels consisting of the hubs, the spokes and the segmental links will be rotated about the fixed shaft or rod 10. The inner ends of the spokes will, consequently, be caused to travel through the grooves of the cams 11 and will be thereby caused to alternately approach and recede, so that, as the opposed links or rim sections reach the lowest point of the wheel and assume positions at opposite sides of the beets, they will be caused to approach and clamp the beet tops so that the continued motion of the wheels will pull the beets from the ground and carry them up and around to the cutter by which the tops will be severed from the bodies. As the links or rim sections pass the cutter, they will be caused to recede from each other and thereby release the tops which may then fall to the ground or be delivered upon a suitable conveyer. It will be readily noted from Fig. 3 that the inner vertically disposed flanges 21 of the rim sections constitute smooth clamping jaws by which the beet tops may be effectually engaged and held without injury to the beet bodies which will be delivered to the cutter.

The supplemental frame 7 is provided near its front end with an arcuate series of openings 22 through any one of which and a similar opening in the main frame a securing bolt 23 may be inserted so as to support the inner frame at any desired angle and thereby adjust the gathering and pulling wheels so as to run at any desired depth as may be necessary to properly engage and uproot the beets. To increase the range of this adjustment the inner frame is preferably provided with lugs 24 upon its upper and lower edges into which the arcuate series of openings may be extended. Depending from the rear end of the inner frame are a pair of standards 25 carrying plows or shovels 26 at their lower ends which project forwardly beyond the pulling wheels and are arranged to travel at the sides of the row of plants and loosen the dirt around the same so that the beets will offer very little, if any, resistance to the uprooting action of the pulling wheels.

I have illustrated a belt or endless conveyer 27 disposed between the pulling wheels and supported upon a pulley 28 fitted upon the hubs of the pulling wheels and a forward pulley 29 carried by a shaft 30 journaled in and extending between the upright arms 31 at the front end of the inner frame. This belt or conveyer 27 is a conventional showing of means for receiving and taking away the beet tops as they are released by the pulling wheels and may be of any desired character and may be arranged to deliver into a basket or other receptacle supported upon the front end of the main frame or may be arranged to feed into a suitable vehicle drawn over the field at the side of the harvester. Similar arrangements may be made to collect and deliver the beet bodies after they pass the cutter.

It will be readily seen from the foregoing description, taken in connection with the accompanying drawings, that I have provided an exceedingly simple and efficient apparatus by which beets will be effectually and automatically uprooted and the tops severed without any attention upon the part of the attendant. The spokes 18 traveling in the stationary cam grooves will cause the segments of the wheel rims to positively approach and clamp the beet tops and hold the tops until they are carried past the cutter and will then automatically release the tops. The resilient quality of the spokes will permit them to automatically adapt themselves to differences in the size or thickness of the beet tops and the plows or shovels 26 traveling in advance of the gathering and pulling wheels will effectually loosen the dirt around the beets and will take under the drooping beet tops and lift the same so that they will be readily and positively directed between the pulling wheels to be engaged by the rim sections of the same.

The particular manner of rotating the pulling wheels and of supporting the cutter is not material and may be varied at will and the arrangement illustrated in the accompanying drawings is to be understood as illustrative merely and not restrictive.

What I claim is:—

1. A beet harvester comprising a pair of pulling wheels having rims consisting of pivotally connected links, spokes supporting said links and forming the pivotal connections between the same, hubs to which the said spokes are pivoted, and cams within the hubs engaging the inner ends of the spokes.

2. A beet harvester comprising a pair of pulling wheels having rims composed of pivoted links each provided with inwardly extending flanges forming clamping jaws, spokes forming the pivotal connections between the said links, and means acting on the spokes to cause the links of the opposed wheels to alternately approach and recede from each other.

3. A beet harvester comprising a stationary shaft having cams thereon, hubs rotatably mounted upon the said shaft and fitting over the cams, means for rotating the hubs, spokes pivotally mounted upon the hubs and engaging the cams, and pivotally connected rim sections carried by the outer ends of the spokes.

4. A beet harvester comprising a main frame, a vertically adjustable supplemental frame carried thereby, a pair of pulling wheels mounted upon the rear end of the supplemental frame, a cutter carried by the rear end of said supplemental frame and disposed over the pulling wheels, and a pair of plows carried by the rear end of the supplemental frame and projecting in advance of the pulling wheels.

5. A beet harvester comprising a pair of pulling wheels consisting of pivotally connected rim sections provided at their inner opposed edges with inwardly extending flanges forming clamping jaws, spokes supporting the said rim sections and forming the pivotal connections for the same, and means acting upon the spokes to cause the jaws to approach and recede from each other.

In testimony whereof I affix my signature in presence of two witnesses.

JOHN KEHR. [L. S.]

Witnesses:
W. C. GALBRAITH,
J. A. FINDLAY.

Copies of this patent may be obtained for five cents each, by addressing the "Commissioner of Patents, Washington, D. C."